US 8,558,833 B1

(12) United States Patent
Moreton

(10) Patent No.: US 8,558,833 B1
(45) Date of Patent: Oct. 15, 2013

(54) SYSTEM AND METHOD FOR SYMMETRIC PARAMETERIZATION OF INDEPENDENTLY TESSELLATED PATCHES

(75) Inventor: Henry Packard Moreton, Woodside, CA (US)

(73) Assignee: Nvidia Corporation, Santa Clara, CA (US)

( * ) Notice: Subject to any disclaimer, the term of this patent is extended or adjusted under 35 U.S.C. 154(b) by 1022 days.

(21) Appl. No.: 12/579,365

(22) Filed: Oct. 14, 2009

(51) Int. Cl.
*G06T 15/30* (2011.01)
*G06T 17/20* (2006.01)

(52) U.S. Cl.
USPC .......................... 345/423; 345/419; 345/420

(58) Field of Classification Search
None
See application file for complete search history.

(56) References Cited

U.S. PATENT DOCUMENTS

| | | | | |
|---|---|---|---|---|
| 5,459,821 A * | 10/1995 | Kuriyama et al. | ............ | 345/420 |
| 5,550,960 A * | 8/1996 | Shirman et al. | ............... | 345/582 |
| 6,275,235 B1 * | 8/2001 | Morgan, III | .................. | 345/582 |
| 6,807,290 B2 * | 10/2004 | Liu et al. | ........................ | 382/118 |
| 6,931,155 B1 * | 8/2005 | Gioia | ............................ | 382/232 |
| 8,269,770 B1 * | 9/2012 | Carr et al. | ...................... | 345/423 |
| 2004/0070586 A1 * | 4/2004 | Taubin | ........................ | 345/423 |
| 2004/0075655 A1 * | 4/2004 | Dunnett | ....................... | 345/418 |

OTHER PUBLICATIONS

Munkberg, et al. "Non-Uniform Fractional Tessellation," Graphics Hardware, The Eurographics Association, 2008.
Munkberg, et al. "Non-Uniform Fractional Tessellation," Slides from Lund University, 2008.

* cited by examiner

*Primary Examiner* — Said Broome
(74) *Attorney, Agent, or Firm* — Patterson & Sheridan, L.L.P.

(57) ABSTRACT

One embodiment of the present invention sets forth a technique for consistently evaluating geometric patches with shared boundaries using barycentric coordinates. A barycentric parameter is generated and represented using a fixed-point fraction. The barycentric parameter is then used to generate a fixed-point barycentric coordinate. The fixed-point barycentric coordinate is then converted to a floating-point representation for evaluating the geometric patches. Computing shared boundary splits using fixed-point fractions eliminates inconsistencies in associated barycentric coordinates due to round-off errors. Evaluating geometric patch equations using consistent barycentric coordinates facilitates precise, consistent computation of vertices along shared boundaries.

20 Claims, 10 Drawing Sheets

SYSTEM AND METHOD FOR SYMMETRIC PARAMETERIZATION OF INDEPENDENTLY TESSELLATED PATCHES

BACKGROUND OF THE INVENTION

1. Field of the Invention

The present invention generally relates to geometric processing in graphics systems and more specifically to a system and method for symmetric parameterization of independently tessellated patches.

2. Description of the Related Art

Modern three-dimensional (3D) graphics systems are typically configured to generate one or more graphics images from one or more graphics scenes, with each graphics scene comprising one or more geometric models. The one or more graphics images are then displayed or stored for display later. Each geometric model may include geometric objects such as triangles, meshes, parametric patches, or other types of constructs useful in rendering a graphics scene. In many applications the meshes should not have any cracks or holes, and should not include any overlapping geometry. Certain types of high-level geometric objects, such as parametric patches, may be conveniently represented and manipulated using a relatively small set of high-level attributes. To render a high-level geometric object using a conventional graphics hardware pipeline, the high-level geometric object is tessellated into triangles, which are then rendered by the graphics hardware pipeline. Certain graphics hardware pipeline architectures provide programmable geometry processing functionality, including tessellation.

A parametric quad patch is one class of useful geometric object. A given parametric quad patch may be usefully represented and evaluated using a barycentric parameterization, which defines each quad patch parameter in a range from zero to one. Each parametric quad patch is typically defined by four boundaries (edges), and each boundary is parameterized using a pair of parameters that maintain a property of having a sum equal to one (1.0). Each parameter is typically represented using a floating-point value. Along a given boundary, a primary parameter from the pair of parameters ranges from zero to one, while a second parameter ranges from one to zero, maintaining a sum of the two parameters that is equal to one.

A geometric model may include two or more parametric quad patches that form a mesh that defines at least part of the geometric model. Each of the two or more parametric quad patches typically shares at least one abutting boundary with an adjacent parametric quad patch. When the geometric model is rendered, each given parametric quad patch is tessellated into a corresponding se of triangles for shading. Each parametric quad patch may be tessellated independently of any neighboring quad patches. During tessellation, each boundary for a given parametric quad patch is split into a predetermined number of segments that define corresponding triangle vertices along the boundary. For example, a boundary may be split into three equal portions to create vertices for associated triangles. Each split is performed with respect to an associated parametric quad patch during tessellation of the quad patch. As a result, each shared boundary is split independently for each parametric quad patch.

Persons skilled in the art will understand that, in general, adjacent parametric quad patches cannot be consistently parameterized with respect to a given arbitrary shared boundary in an arbitrary mesh of quad patches. As a consequence, two adjacent parametric quad patches may share two common vertices (V1 and V2) that define a common boundary that is parameterized in opposite directions with respect to the common vertices. More specifically, one parametric quad patch may be parameterized with barycentric parameter pair (0.0, 1.0) at V1 and (1.0, 0.0) at V2, while the adjacent parametric quad patch may be parameterized with barycentric parameter pair (1.0, 0.0) at V1 and (0.0, 1.0) at V2.

In a scenario where the common boundary is split into three portions, one parametric quad patch may include a particular vertex at a position that is logically "⅓" (⅓, ⅔) along the boundary while the other parametric quad patch may include a matching vertex that is logically in the same location, which corresponds to "⅔" (⅔, ⅓) along the boundary running in an opposite direction. Because each position is represented using a floating-point approximation of a fraction, round-off error will commonly perturb the location represented by each of the two vertices differently. In some cases, the round-off error can sufficiently perturb one of the vertices away from the other to cause a crack or a hole in the mesh, leading to diminished image quality in the graphics images generated by the 3D graphics system.

Accordingly, what is needed in the art is a system and method for tessellating parametric quad patches within a mesh without introducing holes in the mesh.

SUMMARY OF THE INVENTION

One embodiment of the present invention sets forth a method for evaluating a geometric patch for a tessellation operation when rendering a graphics image. The method includes the steps of generating a first fixed-point barycentric parameter corresponding to a first barycentric parameter, computing a second fixed-point barycentric parameter corresponding to a second barycentric parameter based on the first fixed-point barycentric parameter, generating a floating-point barycentric coordinate based on the first fixed-point barycentric parameter and the second fixed-point barycentric parameter, and generating a vertex located on a boundary shared by a first geometric patch and a second geometric patch for use in the tessellation operation based on the floating-point barycentric coordinate.

One advantage of the disclosed method is that, by consistently evaluating geometric patches along shared boundaries in an order-invariant manner, tessellation may be advantageously performed without holes or cracks being formed along the shared boundaries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
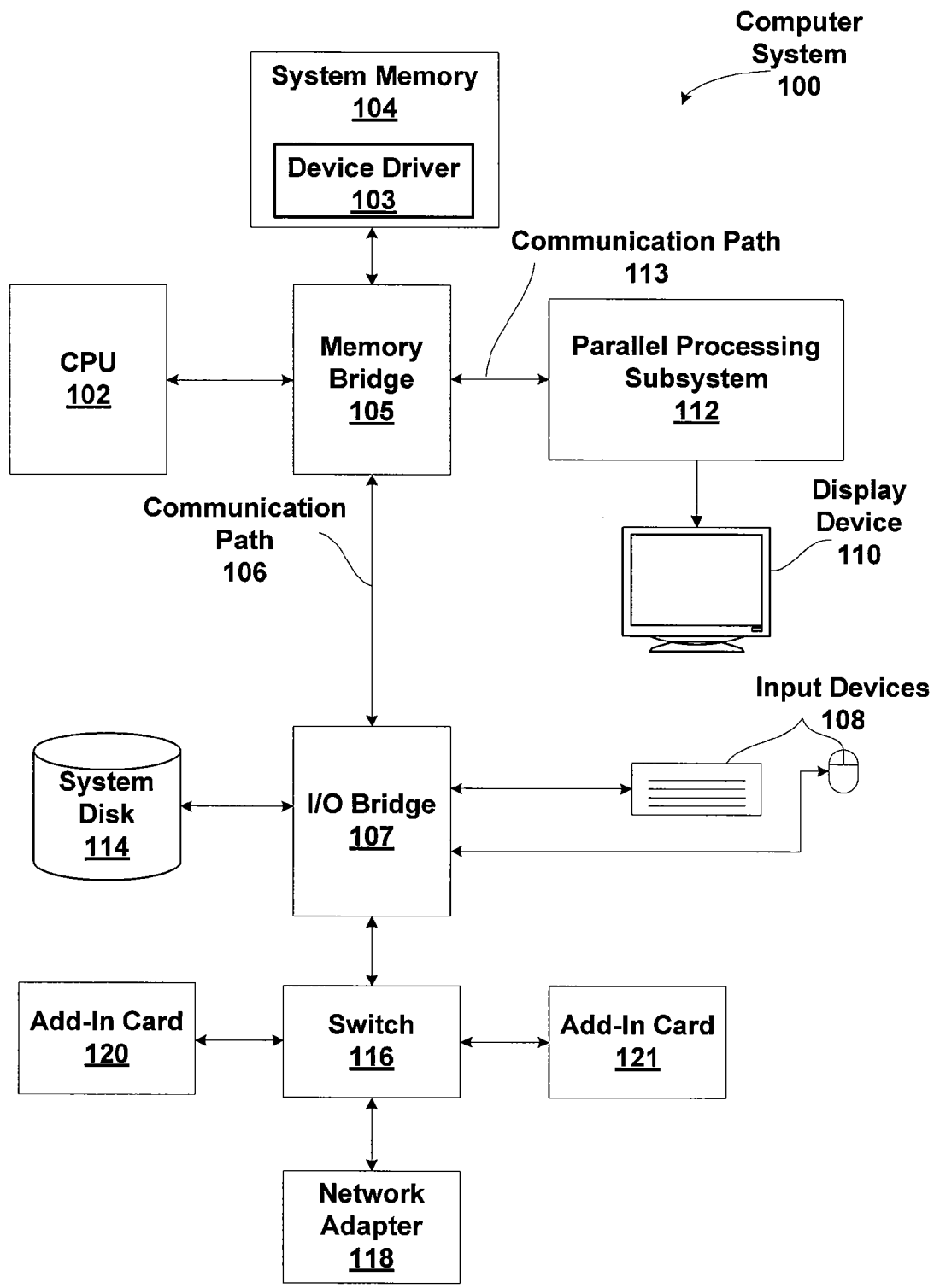
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
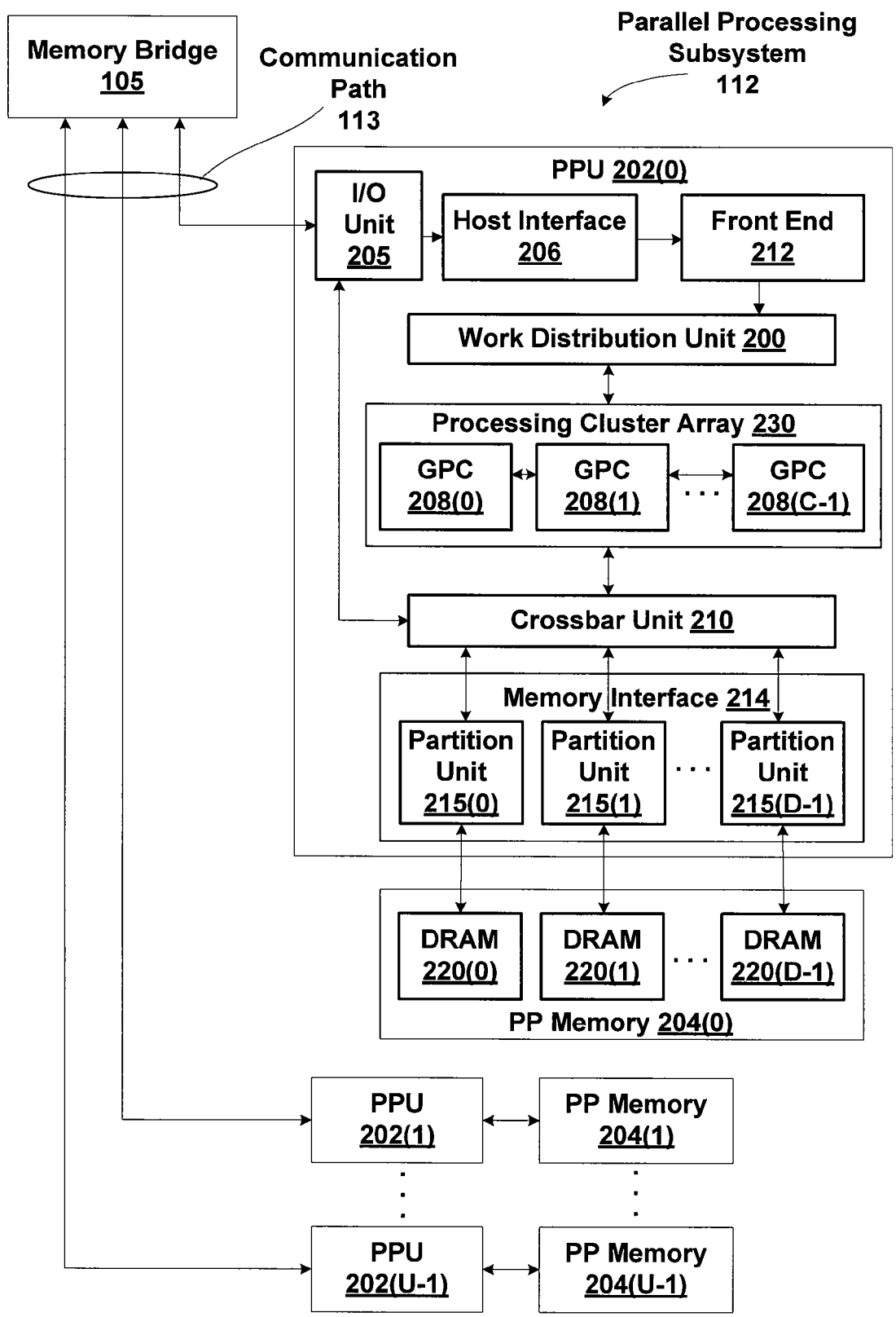
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
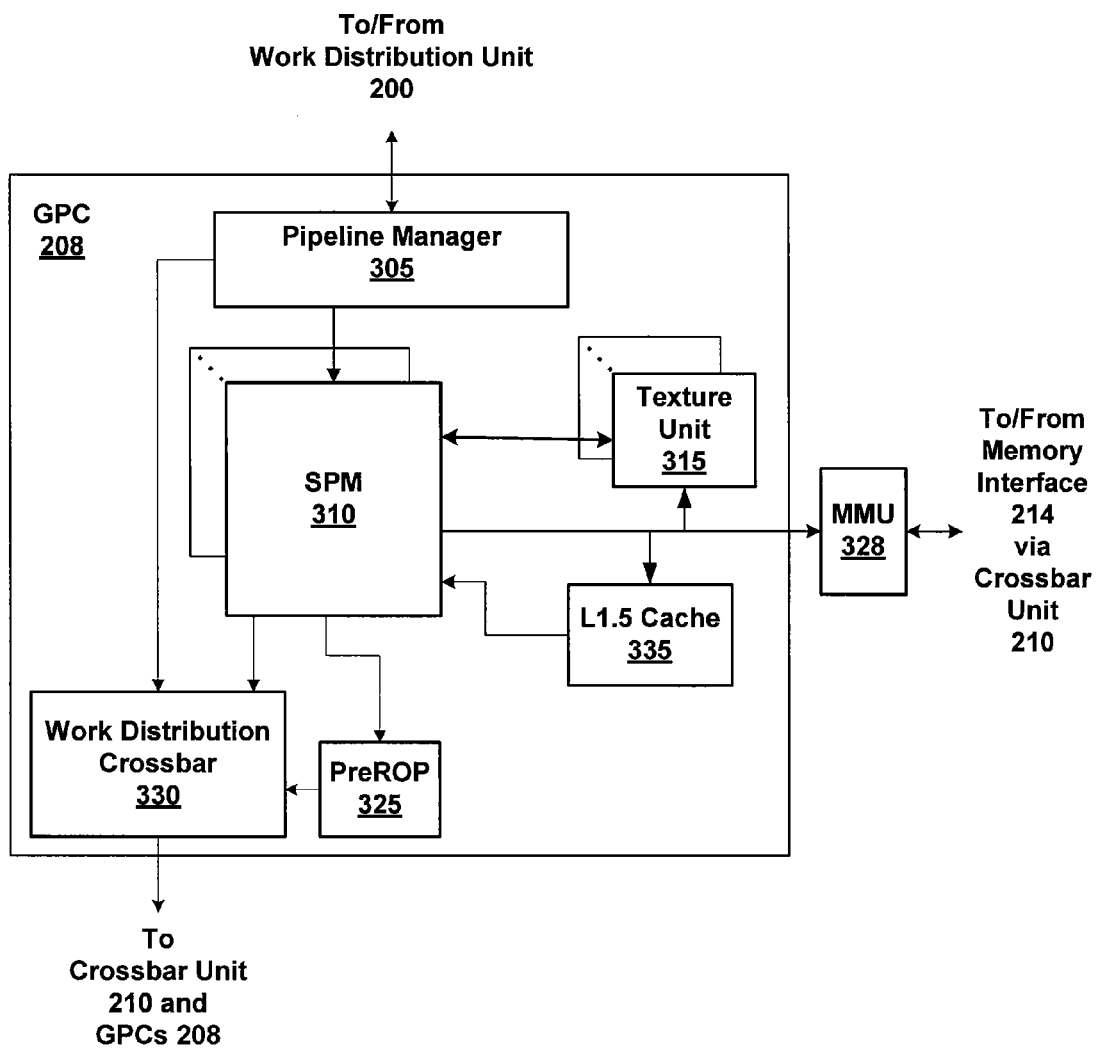
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
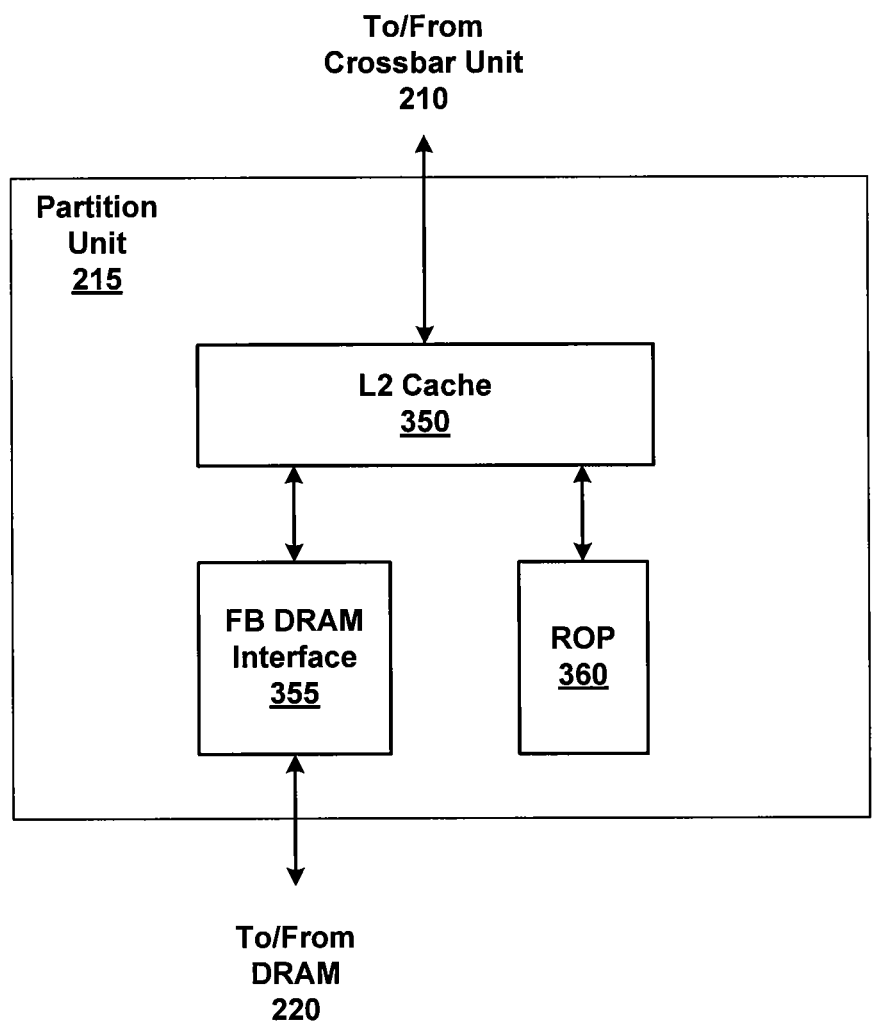
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
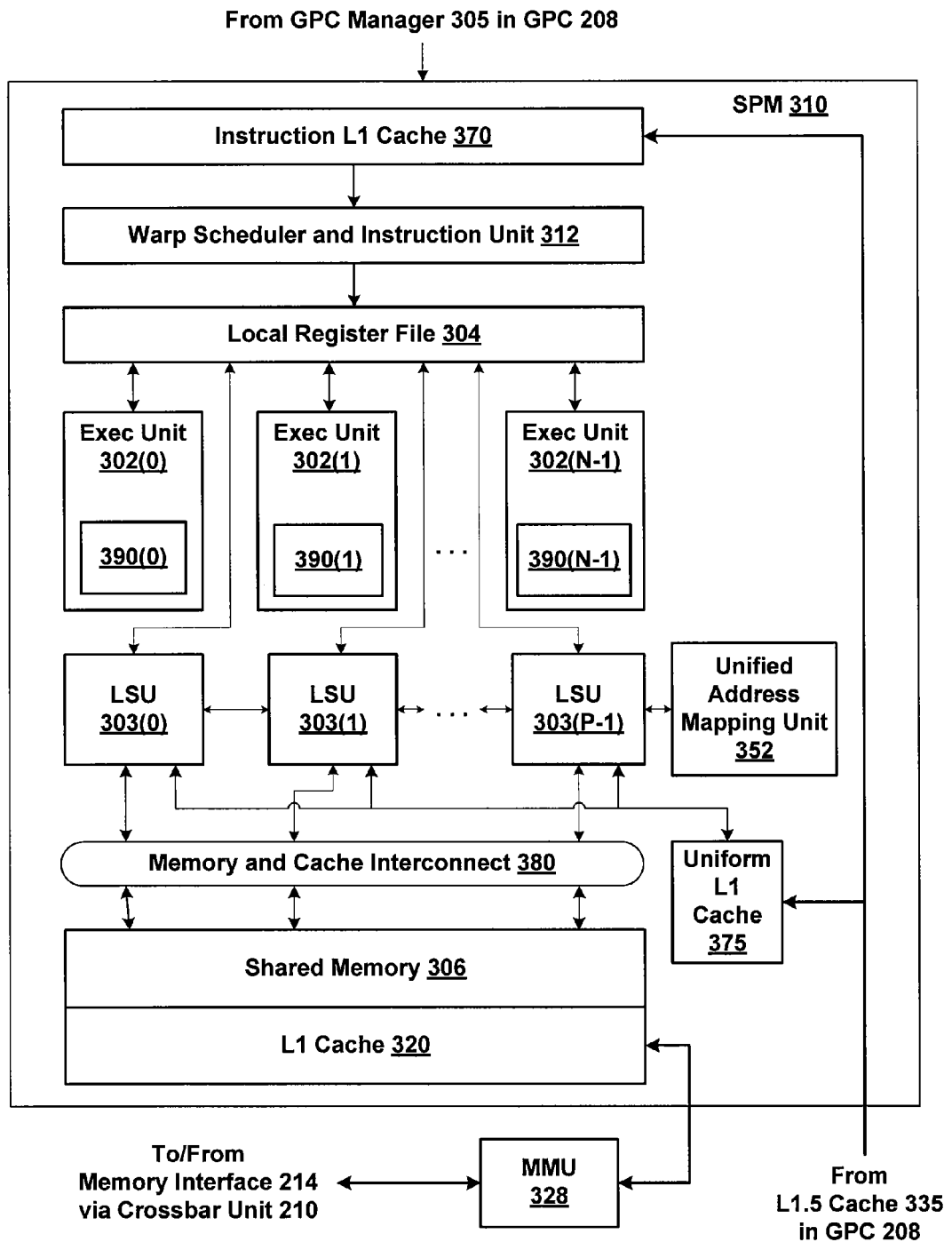
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Graphics Pipeline Architecture

Figure 4:
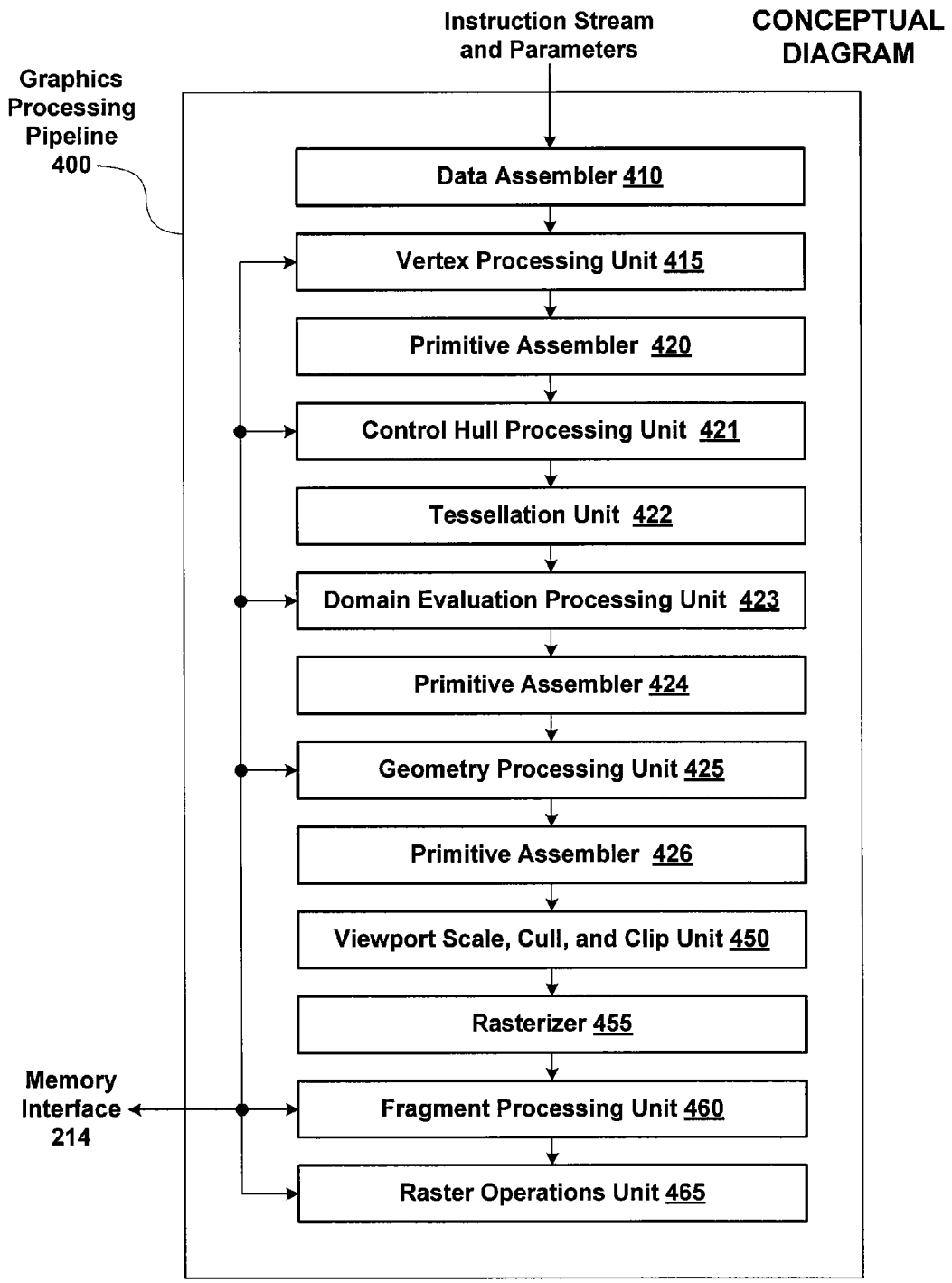
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by control hull processing unit 421. Graphics primitives include triangles, line segments, points, and the like.

The control hull processing unit 421 transforms control points for a geometric patch from a basis representation to an application representation for tessellation. The control hull processing unit 421 also computes tessellation factors for edges of geometric patches. A tessellation factor applies to a single edge and quantifies a view-dependent level of detail associated with the edge. A tessellation unit 422 is configured to receive the tessellation factors for edges of a patch and to tessellate the patch into multiple geometric primitives such as triangle or quad primitives, which are transmitted to a domain evaluation processing unit 423. The domain evaluation processing unit 423 operates on parameterized coordinates for a geometric primitive to generate a surface representation and vertex attributes for each vertex associated with the geometric primitive.

Primitive assembler 424 receives vertex attributes from domain evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Symmetric Parameterization for Geometric Patch Evaluation

A geometric patch may comprise a triangle, a quad patch, or any other construct useful for describing physical structure for rendering a graphics scene. One form of quad patch is a Bézier parametric quad patch, or simply "parametric quad patch," which may be configured using four control points to completely define a corresponding geometric shape. The parametric quad patch may be sampled using a form of coordinates known in the art as barycentric coordinates. Under a barycentric coordinate regime, each vertex (control point) of the parametric quad patch is assigned a barycentric variable. At each vertex, a corresponding barycentric variable is assigned a value of zero. The barycentric variable increases in value along an associated edge until reaching an adjacent vertex, where the barycentric variable is assigned a value of one. A barycentric variable assigned to the adjacent vertex varies inversely, so that the sum of any two barycentric variables associated with a common edge is equal to one. A set of one or more barycentric variables associated with a common geometric patch is referred to in the art as a barycentric coordinate. Persons skilled in the art will understand that embodiments of the present invention may be applied to parametric quad patches, triangles, or any other type of geometric patch that may be represented within a barycentric coordinate regime.

Figure 5A:
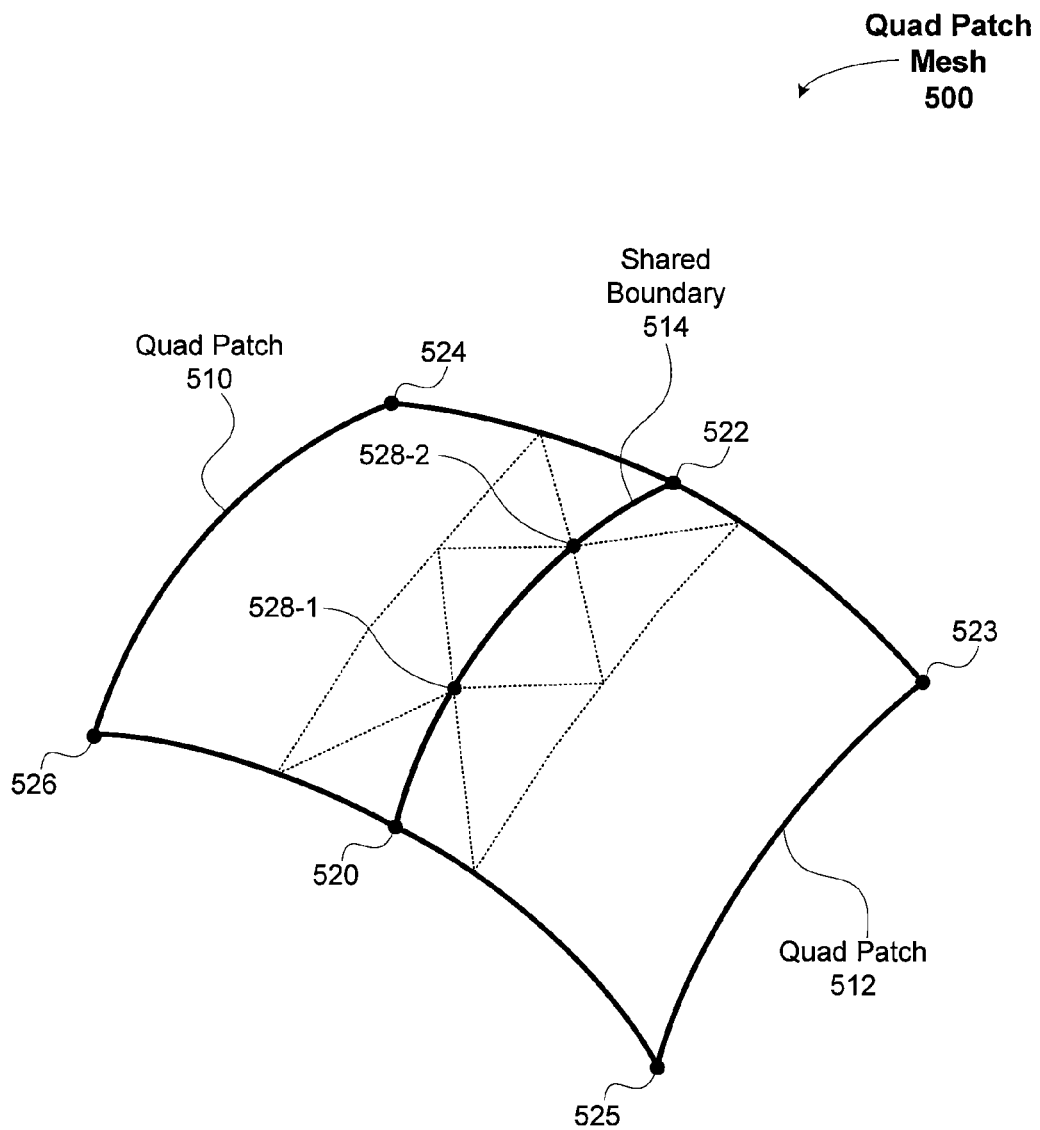
FIG. 5A illustrates a quad patch mesh comprising two parametric quad patches having a shared boundary, according to one embodiment of the present invention.

FIG. 5A illustrates a quad patch mesh 500 comprising two parametric quad patches 510, 512 having a shared boundary 514, according to one embodiment of the present invention. Each parametric quad patch 510, 512 is defined by four control points. Parametric quad patch 510 is defined by control points 520, 522, 524, 526, and parametric quad patch 512 is defined by control points 520, 522, 523, 525.

As part of an overall rendering process for an associated graphics scene, each parametric quad patch 510, 512 is independently tessellated into a mesh of triangles for rendering. To maintain image quality, each mesh of triangles should fully cover the extent of the respective parametric quad patch 510, 512. Furthermore, each shared boundary, such as shared boundary 514, should be fully covered by the mesh of triangles without cracks or holes and without redundant coverage. Persons skilled in the art will understand that each mesh and each shared boundary should not include any "T" joints because a location of a vertex at a T joint is conventionally computed independently from other adjacent geometry, which can lead to cracking due to slight floating-point inconsistencies in the independent computations. Similarly, other independently computed vertex locations may include floating-point inconsistencies that result in cracks. Consequently, vertices 528, which are formed along the shared boundary 514, should be consistently represented in both parametric quad patches 510, 512.

Generating vertices 528 for a given parametric quad patch involves evaluating the quad patch using predefined parameter values reflecting a set of locations along the shared boundary 514. A 3D coordinate for each vertex is computed as a function of the parameter associated with the shared boundary 514. For example, a 3D coordinate for vertex 528-1 may be computed with respect to parametric quad patch 510 using a parameter with a predefined value of one-third. A barycentric coordinate corresponding to vertex 528-1 is therefore (⅓, (1.0-⅓)). Similarly, vertex 528-2 may be computed with respect to parametric quad patch 510 using a parameter with a predefined value of two-thirds. A barycentric coordinate corresponding to vertex 528-2 is therefore (⅔, (1.0-⅔)).

In one embodiment, barycentric coordinates (u, v) are applied to Equation 1, (below), to compute a corresponding 3D vertex Vn. Control point P0 corresponds to control point 520, control point P1 corresponds to control point 526, control point P2 corresponds to control point 524, and control point P3 corresponds to control point 522.

$$V_n = P_0 u^3 + 3P_1 u^2 v + 3P_2 u v^2 + P_3 v^3 \qquad \text{(Equation 1)}$$

Persons skilled in the art will recognize that other equations may be used to represent a parametric quad patch and to compute related vertices. However, regardless of the specific equation used, vertices 528 along the shared boundary 514 should be computed identically with respect to each parametric quad patch 510, 512, or holes may develop in a resulting tessellated mesh.

Figure 5B:
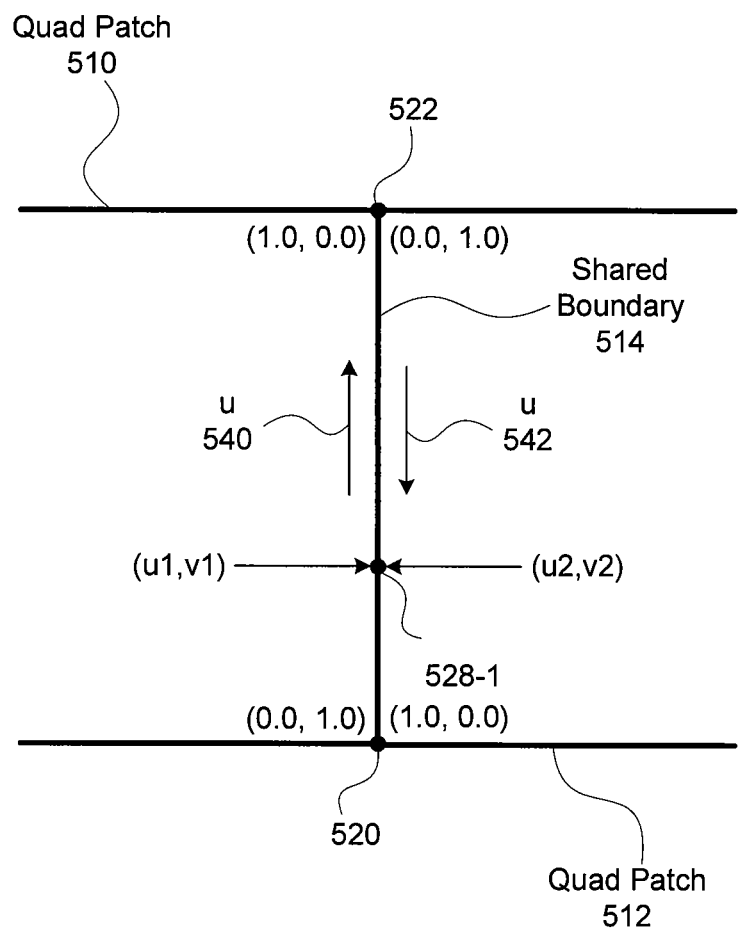
FIG. 5B illustrates the two parametric quad patches having a conflicting parameterization along the shared boundary, according to one embodiment of the present invention.

FIG. 5B illustrates the two parametric quad patches 510, 512 having a conflicting parameterization along the shared boundary 514, according to one embodiment of the present invention. As shown, quad patch 510 is parameterized with u 540 set to 0.0 at control point 520 and 1.0 at control point 522. However, quad patch 512 is parameterized with u 542 set to 1.0 at control point 520 and 0.0 at control point 522. In this example, the shared boundary 514 is split in thirds. Therefore, when quad patch 510 is evaluated for vertex 528-1, barycentric coordinate u1=⅓, v1=(1-⅓) is used. When quad patch 512 is evaluated for vertex 528-1, barycentric coordinate u2=⅔, v2=(1-⅔) is used.

One problem associated with prior art solutions for evaluating a parametric quad mesh using barycentric coordinates is that a conventional floating-point representation of an arbitrary number is generally not precise, leading to inconsistent evaluation of vertex 528-1 with respect to the different quad patches 510, 512. For example, the least significant mantissa bit in a floating-point representation of ⅓ has a different magnitude than the least significant mantissa bit used to represent ⅔. The floating-point representation of ⅓, which is less than ½, requires a different floating-point exponent than the floating-point representation of ⅔, which is greater than ½. As a result, barycentric coordinate (u1, v1=1−u1) along control points 520, 522 may produce a vertex 528-1 that is slightly offset versus vertex 528-1 produced by barycentric coordinate (u2, v2=1−u2) using an opposite (inconsistent) parameterization.

A tessellation function provides each barycentric parameter "u" for evaluating a particular parametric quad patch, and then an evaluation function computes barycentric parameter "v" for evaluating the parametric quad patch. In one embodiment, the tessellation function uses the parameter unit 390 of FIG. 3C to generate a set of barycentric parameters for evaluating each parametric quad patch 510, 512. The barycentric parameters generated by the parameter unit 390 are represented as fixed-point fractions. The fixed-point fractions are then used to compute barycentric parameter pairs (such as "u" and "v"). Because mantissa bits in the fixed-point fraction have consistent values throughout a represented range of 0.0 through 1.0, inconsistencies due to round-off errors may be avoided in computing a fixed-point value of "v=1−u" using the fixed-point parameter for "u." A fixed-point value for barycentric parameter "u" is generated by the parameter unit 390, and a fixed-point value for barycentric parameter "v" is then computed from the fixed-point value for "u." The resulting fixed-point barycentric coordinate (u,v) is converted, without any change in value or loss of precision, to a floating-point representation that maybe used for further operations, such as evaluating the parametric quad patch.

Importantly, a given floating-point barycentric coordinate that is derived from a corresponding fixed-point coordinate is not susceptible to inconsistencies due to round-off errors, because the fixed-point representation is inherently consistent and converting fixed-point values to floating-point values is an exact process. Therefore, adjacent parametric quad patches may be consistently evaluated despite conflicting parameterizations along shared boundaries.

Consistent generation of barycentric coordinates is one of two requirements for consistent evaluation of a parametric quad patch defined by barycentric coordinates. Using fixed-point fractions to generate each barycentric parameter satisfies this requirement. The second requirement is that the parametric quad patch should be evaluated in an order that is invariant with respect to an associated barycentric coordinate or associated barycentric coordinates. In other words, a sequence of arithmetic operations may be used to evaluate an equation, such as Equation 1, (above), that describes the parametric quad patch. The sequence of arithmetic operations should be ordered to avoid round-off errors that are dependent on the barycentric coordinate(s). For example, Equation 1 may be computed in an order specified below in Equation 2 for invariance with respect to barycentric coordinate (u,v):

$$V_n = (P_0 u^3 + P_3 v^3) + (3P_1 u^2 v + 3P_2 uv^2) \quad \text{(Equation 2)}$$

Figure 5C:
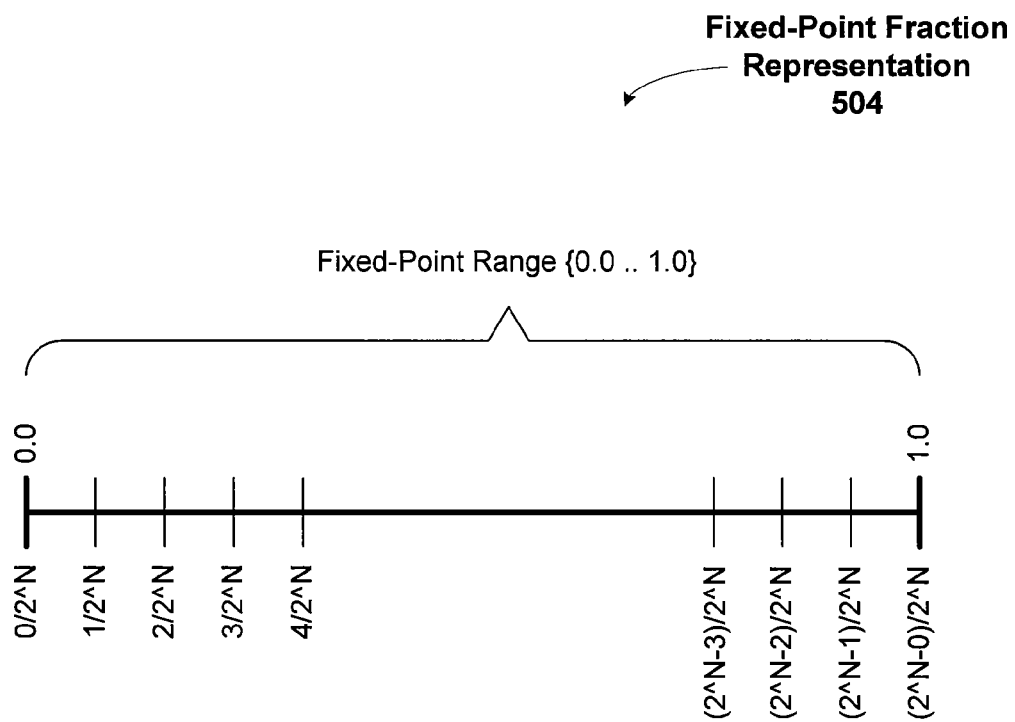
FIG. 5C illustrates a fixed-point fraction representation for generating symmetric barycentric parameters, according to one embodiment of the present invention.

FIG. 5C illustrates a fixed-point fraction representation 504 that may be used to generate symmetric barycentric parameters, according to one embodiment of the present invention. The fixed-point representation spans a range of 0.0 to 1.0, inclusive. A binary code is used for each value from 0.0 through 1.0. In one embodiment, the fixed-point fraction has a value corresponding to an n-bit binary number divided by $2^N$, where n=N+1. For example, if N=16, then n=17, and the binary number ranges from 0 (0x00000) to $2^{16}$ (0x10000), inclusive. This particular example provides a range of $0/(2^{16})=0.0$ through $(2^{16})/(2^{16})=1.0$, with 16-bit resolution. Persons skilled in the art will understand that other fixed-point representations may be used to generate parameters for use in computing barycentric coordinates without departing the scope of the present invention.

Figure 6:
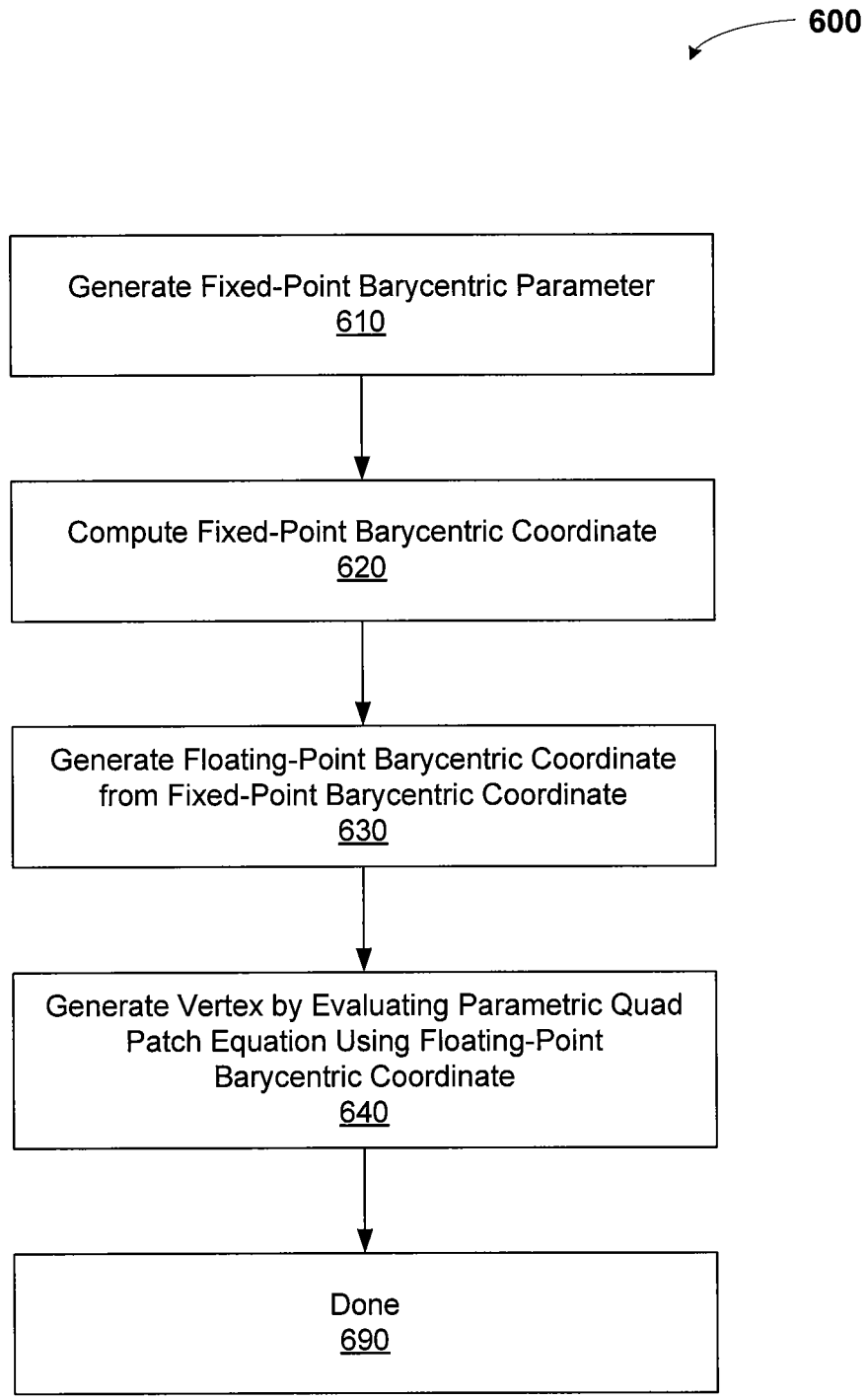
FIG. 6 is a flow diagram of method steps for evaluating a parametric quad patch using barycentric parameters, according to one embodiment of the present invention.

FIG. 6 is a flow diagram of method steps 600 for evaluating a parametric quad patch using barycentric parameters, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

The method begins in step 610, where the parameter unit 390 of FIG. 3C generates a fixed-point barycentric parameter corresponding to barycentric parameter "u." The fixed-point barycentric parameter "u" is specified in a range of 0.0 to 1.0, inclusive. In step 620, a shader program executing on execution unit 302 computes a barycentric coordinate (u,v) by computing a second fixed-point barycentric coordinate "v" using equation v=1.0−u. In step 630, the shader program executing on execution unit 302 then generates a floating-point barycentric coordinate from the fixed-point barycentric coordinate.

In step 640, the shader program executing on execution unit 302 generates a vertex by evaluating a parametric quad patch equation using the floating-point barycentric coordinate. As described above in FIG. 5B, the equation is computed in an order that is invariant to u and v round-off error. The method terminates in step 690.

In sum, a technique for consistent evaluation of parametric quad patches using barycentric coordinates is disclosed. A barycentric parameter is generated using a fixed-point fraction. The fixed-point barycentric parameter is then used to compute a barycentric coordinate that can be converted to a floating-point barycentric coordinate that is free of inconsistent round-off errors. The floating-point barycentric coordinate is then used to compute a vertex disposed along a boundary of a parametric quad patch when evaluating a corresponding equation. This equation is evaluated in a manner that is invariant to round-off error with respect to the floating-point barycentric coordinate.

By consistently evaluating the parametric quad patches along shared boundaries in such a manner, tessellation may be advantageously performed on meshes having parametric quad patches without holes or cracks being formed along shared boundaries. In contrast, prior art techniques typically generate occasional holes in tessellated quad patch meshes.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for evaluating a geometric patch for a tessellation operation when rendering a graphics image in a graphics processing pipeline, the method comprising:

generating, with a processing unit a first fixed-point barycentric parameter corresponding to a first barycentric parameter;

computing a second fixed-point barycentric parameter corresponding to a second barycentric parameter based on the first fixed-point barycentric parameter, wherein the second fixed-point barycentric parameter is computed by subtracting the first fixed-point barycentric parameter from 1;

generating a floating-point barycentric coordinate for use in the tessellation operation based on the first fixed-point barycentric parameter and the second fixed-point barycentric parameter; and generating a vertex located on a boundary shared by a first geometric patch and a second geometric patch for use in the tessellation operation based on the floating-point barycentric coordinate.

2. The method of claim 1, wherein the step of generating the vertex comprises evaluating a geometric patch equation using the floating-point barycentric coordinate in an order that is invariant to round-off errors associated with the first barycentric parameter and the second barycentric parameters.

3. The method of claim 2, wherein the geometric patch equation is $V_n = P_0 u^3 + 3P_1 u^2 v + 3P_2 uv^2 + P_3 v^3$, and wherein $V_n$ corresponds to the vertex, $P_0$ corresponds to a first control point associated with the first geometric patch and located on the shared boundary, $P_1$ corresponds to a second control point associated with the first geometric patch, $P_2$ corresponds to a third control point associated with the first geometric patch, $P_3$ corresponds to a fourth control point associated with the first geometric patch and located on the shared boundary, and u and v are fixed point fractions that, together, define the floating-point barycentric coordinate.

4. The method of claim 3, wherein the order-invariant formulation of the geometric patch equation is $V_n = (P_0 u^3 + P_3 v^3) + (3P_1 u^2 v + 3P_2 uv^2)$.

5. The method of claim 1, wherein each of the fixed-point representations of the first fixed-point barycentric parameter and the second fixed-point barycentric parameter spans a range from 0.0 to 1.0, and each fixed-point fraction has a value corresponding to an n-bit binary number divided by $2^N$, wherein n=N+1, and N is an integer that provides the N-bit resolution of each fixed-point fraction.

6. The method of claim 5, wherein N is equal to 16.

7. The method of claim 1, wherein the second fixed-point barycentric parameter is computed by subtracting the first fixed-point barycentric parameter from 1.

8. A non-transitory computer-readable medium including instructions that, when executed by a processing unit, cause the processing unit to evaluate a geometric patch for a tessellation operation when rendering a graphics image, by performing the steps of:

based on a first fixed-point barycentric parameter that corresponds to a first barycentric parameter, computing a second fixed-point barycentric parameter corresponding to a second barycentric parameter, wherein the second fixed-point barycentric parameter is computed by subtracting the first fixed-point barycentric parameter from 1;

generating a floating-point barycentric coordinate for use in the tessellation operation based on the first fixed-point barycentric parameter and the second fixed-point barycentric parameter; and generating a vertex located on a boundary shared by a first geometric patch and a second geometric patch for use in the tessellation operation based on the floating-point barycentric coordinate.

9. The non-transitory computer-readable medium of claim 8, wherein the step of generating the vertex comprises evaluating a geometric patch equation using the floating-point barycentric coordinate in an order that is invariant to round-off errors associated with the first barycentric parameter and the second barycentric parameters.

10. The non-transitory computer-readable medium of claim 9, wherein the geometric patch equation is $V_n = P_0 u^3 + 3P_1 u^2 v + 3P_2 uv^2 + P_3 v^3$, and wherein $V_n$ corresponds to the vertex, $P_0$ corresponds to a first control point associated with the first geometric patch and located on the shared boundary, $P_1$ corresponds to a second control point associated with the first geometric patch, $P_2$ corresponds to a third control point associated with the first geometric patch, $P_3$ corresponds to a fourth control point associated with the first geometric patch and located on the shared boundary, and u and v are fixed point fractions that, together, define the floating-point barycentric coordinate.

11. The non-transitory computer-readable medium of claim 10, wherein the order-invariant formulation of the geometric patch equation is $V_n = (P_0 u^3 + P_3 v^3) + (3P_1 u^2 v + 3P_2 uv^2)$.

12. The non-transitory computer-readable medium of claim 8, wherein each of the fixed-point representations of the first fixed-point barycentric parameter and the second fixed-point barycentric parameter spans a range from 0.0 to 1.0, and each fixed-point fraction has a value corresponding to an n-bit binary number divided by $2^N$, wherein n=N+1, and N is an integer that provides the N-bit resolution of each fixed-point fraction.

13. The non-transitory computer-readable medium of claim 12, wherein N is equal to 16.

14. A computing device, comprising:

A processing unit configured to:

based on a first fixed-point barycentric parameter that corresponds to a first barycentric parameter, compute a second fixed-point barycentric parameter corresponding to a second barycentric parameter, wherein the second fixed-point barycentric parameter is computed by subtracting the first fixed-point barycentric parameter from 1;

generate a floating-point barycentric coordinate for use in the tessellation operation based on the first fixed-point barycentric parameter and the second fixed-point barycentric parameter; and generate a vertex located on a boundary shared by a first geometric patch and a second geometric patch for use in the tessellation operation based on the floating-point barycentric coordinate.

15. The computing device of claim 14, wherein the processing unit includes a parameter unit configured to generate the first fixed-point barycentric parameter.

16. The computing device of claim 14, wherein the processing unit is configured to generate the vertex by evaluating a geometric patch equation using the floating-point barycentric coordinate in an order that is invariant to round-off errors associated with the first barycentric parameter and the second barycentric parameters.

17. The computing device of claim 16, wherein the geometric patch equation is $V_n = P_0 u^3 + 3P_1 u^2 v + 3P_2 uv^2 + P_3 v^3$, and wherein $V_n$ corresponds to the vertex, $P_0$ corresponds to a first control point associated with the first geometric patch and located on the shared boundary, $P_1$ corresponds to a second control point associated with the first geometric patch, $P_2$ corresponds to a third control point associated with the first geometric patch, $P_3$ corresponds to a fourth control point associated with the first geometric patch and located on the shared boundary, and u and v are fixed point fractions that, together, define the floating-point barycentric coordinate.

18. The computing device of claim 17, wherein the order-invariant formulation of the geometric patch equation is $V_n = (P_0 u^3 + P_3 v^3) + (3P_1 u^2 v + 3P_2 uv^2)$.

19. The computing device of claim 14, wherein each of the fixed-point representations of the first fixed-point barycentric parameter and the second fixed-point barycentric parameter spans a range from 0.0 to 1.0, and each fixed-point fraction has a value corresponding to an n-bit binary number divided by $2^N$, wherein n=N+1, and N is an integer that provides the N-bit resolution of each fixed-point fraction.

20. The computing device of claim 19, wherein N is equal to 16.

* * * * *